United States Patent Office 3,196,173
Patented July 20, 1965

3,196,173
AMINOALKANESULFONIC ACIDS
Wolf-Dieter Willmund, Dusseldorf-Holthausen, and Hans Krings, Dusseldorf, Germany, assignors to Dehydag Deutsche Hydrierwerke G.m.b.H., Dusseldorf, Germany, a German corporation
No Drawing. Filed June 19, 1957, Ser. No. 666,752
Claims priority, application Germany, July 2, 1956, D 23,257
1 Claim. (Cl. 260—501)

This invention relates to and has as its object the production of novel washing and cleaning agents which are particularly adapted for personal use.

The washing or cleaning agents in accordance with the invention which are particularly adapted for cosmetic purposes comprise high molecular organic aminosulfonic acids having the general formula

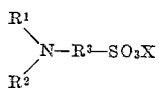

in which $R^1$ is a high molecular aliphatic, aliphatic-cycloaliphatic or aliphatic-aromatic hydrocarbon radical containing at least 8 carbon atoms, $R^2$ is hydroxyl-substituted aliphatic hydrocarbon radical which may contain an ether group and is preferably a hydroxyl-substituted lower aliphatic hydrocarbon, $R^3$ is a bivalent hydrocarbon radical and preferably a lower bivalent hydrocarbon radical which may be substituted with a hydroxyl group, and X is a hydrogen atom or an organic or inorganic base which is capable of forming water soluble salt, such as, an alkali metal, ammonia, primary, secondary, tertiary alkyl amine or oxyalkylamine.

In the above quoted formula the radical $R^1$ may be:
  Octyl-
  Dodecyl-
  Hexadecyl-
  Octadecyl-
  Octadecenyl-
  Ethylcyclohexyl-
  Naphthenyl-
  Iso-propylphenyl-
  Di-iso-butylphenyl-
  n-Octylphenyl-
$R^2$ may be:
  2-hydroxy ethyl-
  3-hydroxy propyl-
  2,3-dihydroxy propyl-
  2-(2'-hydroxy-ethyloxy)-ethyl-
$R^3$ may be:
  -ethylene-
  -propylene-
  -2-hydroxy propylene-
X may be:
  Hydrogen
  Sodium
  Potassium
  Ammonia
  Diethyl amine
  Monoethanol amine
  Diethanol amine
  Triethanol amine
  Cyclohexyl amine
  Methylcyclohexyl amine These organic amino sulfonic acids in accordance with the invention may be prepared in a simple manner by reacting primary amines which contain at least one higher molecular hydrophobic, i.e., lipophilic radical corresponding to $R^1$ in the formula given above, with a halogen alkane sulfonic acid or a salt thereof, thus forming the corresponding aminoalkanesulfonic acid and thereafter treating this aminoalkanesulfonic acid with an agent which will permit the introduction of a hydrocarbon radical containing a hydroxyl group on the nitrogen atom such as an alkylene oxide, as for example, ethylene or propylene oxide. Alternately, the aminoalkanesulfonic acid used as the intermediate may be formed by reaction of oxyalkanesulfonic acid (sultones) with cyclic anhydrides.

The organic aminoalkanesulfonic acids in accordance with the invention may also be prepared from primary organic aminosulfonic acids, as for example, aminoethanesulfonic acid or sulfanilic acid or salts thereof by introducing the higher molecular hydrocarbon radical corresponding to $R^1$ and the hydroxyl substituted radical ($R^2$) on to the nitrogen one after the other in the conventional manner.

Examples of starting primary amines which may be used in accordance with the invention include primarily aliphatic amines, such as, octyl amine, dodecylamine, oleylamine, and octadecylamine and furthermore mixtures of amines, as for example, mixtures of amines corresponding to coconut oil fatty acids as well as alkyl anilines, alkylcyclohexylamines having alkyl radicals ranging for example, from $C_4$ to $C_{18}$, etc.

The conversion of these products may be effected with halogen alkane sulfonic acids or their salts, such as, bromomethanesulfonic acid, 2-bromoethanesulfonic acid-1, 3-bromopropanesulfonic acid-1, 4-bromobutanesulfonic acid-1 or the corresponding chloralkane sulfonic acids, as well as with corresponding substitution products of these sulfonic acids, as for example, 3-chloro-2-hydroxypropanesulfonic acid - 1, 4-bromo-3-hydroxybutanesulfonic acid-1, etc. Additionally, the alkanesulfonic acid radicals can be introduced by means of sultones, such as, 1,3-propanesultone, 1,4-butanesultone, technical mixtures of 1,3 and 1,4-butanesultones and the like.

The introduction of alkyl radical which contains the hydroxyl group and which may contain an ether linkage may be effected with the use of materials, such as, alkylene oxides, for example, ethylene oxide and propylene oxide, as well as glycolchlorohydrin, diglycolchlorohydrin, epichlorohydrin, glycide and the like.

The products in accordance with the invention are preferably prepared by reacting the primary amine or amine mixture in an aqueous solution preferably with the addition of a low molecular alchohol, such as, ethanol, isopropanol, etc. with the halogen alkane sulfonic acid. The reaction proceeds at elevated temperatures with stirring and is completed when a clear water soluble product has been formed. The further reaction with the hydroxyalkylating agents is as a rule effected without isolation of aminoalkane sulfonic acids formed, Thus, for example, ethylene oxide is introduced in the reaction mixture in such a quantity that a hydroxyethyl group is added to the nitrogen. The other hydroxyalkylating agents may be employed in a similar manner.

The higher molecular organic aminosulfonic acids or their salts formed in accordance with the invention are readily soluble in water and exhibit a good washing, cleaning, wetting, dispersing and foaming properties. The use as washing and cleaning agents is effected in the conventional manner in the conventional mixtures. These organic aminosulfonic acids or their salts are compatible with the known inorganic or organic washing agent additives, as for example, soda, phosphates, silicates, sulfates, etc. and are furthermore compatible with carboxymethylcellulose, cellulose ethers, fatty acid alkanolamides, super-fatting agents, etc. Additionally, they may be used together with the known anion-active or even non-ionic compounds. It has been found preferable to combine the products with their non-hydroxyalkylated intermediate products, the nitrogen group of which is neutralized by inorganic or organic acids. These compounds thus correspond to the general formula given above with $R^2$ replaced by hydrogen and nitrogen saturated with an inorganic or organic acid. These compounds, as for example the hydrochloride of sodium 3-dodecylamino-2-hydroxypropanesulfonate may be used in quantities of 5–60% based on the di-substituted organic aminosulfonic acids in accordance with the invention. Other secondary aminoalkane sulfonic acids of this type are:

3-octylamino-2-hydroxypropane sulfonic acid
3-octadecylamino-2-hydroxypropane sulfonic acid
3-dodecylamino-propane sulfonic acid
3-diisobutylphenylamino-propane sulfonic acid
2-n-octylphenylamino-ethane sulfonic acid
2-propylcyclohexylamino-ethane sulfonic acid These sulfonic acids are neutralized by inorganic or organic bases respectively such as sodium or potassium hydroxide ammonia, alkylamines, alkanolamines and the like. The following acids may be used to saturate the nitrogen atoms of these acids:

> Hydrochloric acid
> Hydrobromic acid
> Sulfuric acid
> Nitric acid
> Phosphoric acid
> Boric acid
> Acetic acid
> Propionic acid
> Oxalic acid
> Adipic acid
> Benzoic acid The washing and cleaning agents in accordance with the invention have excellent washing and cleaning properties and are particularly adapted for personal, as for example, cosmetics, such as, shampooing purposes. The foaming action of the product in hard water is excellent and when used as a shampoo, the hair is imparted a soft feel and after washing may be easily set and has an attractive luster. The products are extremely well tolerated by the skin and do not cause any irritations even in connection with sensitive people. In addition, the products exhibit a good bacteriostatic action against gram positive bacteria and in particular skin bacteria and skin or hair fungi.

The following examples are given by way of illustration and not limitation.

*Example 1*

202 grams of a mixture of alkylamines, the alkyl radicals of which correspond to those of coconut oil fatty acid, are treated with 80 grams of isopropanol and heated until the alcohol boils. Thereupon 220 grams sodium 3-chloro-2-oxypropanesulfonate dissolved in 600 cc. of water and 125 grams 32% caustic soda solution are introduced over the course of one hour while agitating and stirring is continued for 10 hours. Ethylene oxide is introduced into the clear water soluble reaction product at 70–80° C. until 44 grams have been absorbed. After neutralization with dilute hydrochloric acid and concentration of the reaction solution, the sodium 3-(N-alkyl-N-hydroxyethyl)-amino-2-hydroxypropanesulfonate is obtained in the form of a slightly yellow, viscous aqueous solution. The reaction takes place quantitatively. This liquid product is excellently suitable for use as hairwash in aqueous solutions containing about 1–5 grams per liter. Instead of the sodium salt the ammonia salt or the diethyl amine salt may be likewise prepared.

If the ethylene oxide in the above reaction is replaced by an equivalent quantity of glycide, there is obtained sodium 3 - (N-alkyl-N-α,β-dihydroxypropyl)-amino-2-hydroxypropanesulfonate which is also an excellent hairwashing agent. Futhermore instead of the alkyl amine mixture an equivalent amount of diisobutylaniline may be used for preparing the sodium 3-(N-diisobutylphenyl-N-hydroxyethyl)-amino-2-hydroxypropanesulfonate under analogous conditions.

*Example 2*

A mixture of 185 grams dodecylamine and 80 grams isopropanol is heated to boiling and there are then added gradually over the course of 30 minutes while stirring, a solution of 115 grams sodium bromoethane sulfonate in 175 grams of water. Stirring is continued for 3 hours and the solutions of 115 grams sodium bromoethane sulfonate in 175 grams of water and 40 grams sodium hydroxide in 80 grams of water are then simultaneously added, also over the course of 30 minutes, in such a manner that the reaction solution at all times remains weakly alkaline. After continued stirring for 10 hours, ethylene oxide is introduced at 70–80° C. until an increase in weight of 44 grams has been obtained. The reaction product is neutralized with dilute hydrochloric acid, ethanol is added and it is then set aside to crystallize. The sodium 2-(N-dodecyl-N-hydroxyethyl)-aminoethanesulfonate formed is isolated and obtained in a yield of 95% of the theoretical yield. This product constitutes an extremely effective washing and cleaning agent for cosmetic purposes when employed in 1–5% aqueous or alcoholic-aqueous solution. This is also true of the product which is obtained in accordance with the above example when propylene oxide is employed as starting material instead of ethylene oxide.

Instead of the sodium salt one may prepare the corresponding monoethanol- or diethanolamine salt.

Valuable washing and cleaning agents having an excellent anti-bacterial action are furthermore obtained if only 33 grams or 22 grams of ethylene oxide are used for the ethylene oxide addition in the above example, and if the secondary amino groups and the non-substituted portion of the end product are saturated with hydrochloric acid.

Instead of the ethylene oxide one may use diglycolchlorohydrine for performing the sodium 2-(N-dodecyl-N-hydroxyethyloxy-ethyl)-aminoethane sulfonate under adapted conditions.

*Example 3*

200 grams of a mixture of alkyl amine, the alkyl radicals of which correspond to those of coconut oil fatty acids are treated with 50 grams of isopropanol and heated while stirring at 75° C. Thereupon 122 grams of propane sultone, dissolved in 50 grams isopropanol are added slowly, drop by drop with the stirring being then continued for three hours. There is slowly added to the reaction solution 40 grams of caustic soda solution dissolved in 300 grams water and the solution is then treated with ethylene oxide at 70–80° C. until 44 grams have been absorbed. The reaction solution is worked up in accordance with Example 1.

The sodium 3-(N-alkyl-N-hydroxyethyl)-amino-propane sulfonate is obtained in theoretical yield. 0.5–5% aqueous solutions of this product foam greatly and have an excellent washing ability even in hard water. They are particularly well suited for disinfectant washes in which the greatest possible gentleness of treatment of the skin is important, for instance for medical practice.

Instead of the sodium salt the potassium salt or the cyclohexyl amine salt may be prepared in an analogous manner.

*Example 4*

Instead of the mixture of alkyl amine used in accordance with Example 1, there are employed—other conditions being the same—267 grams p-dodecylcyclohexylamine and the reaction product obtained thereby is worked up as in said example. The sodium 3-(N-dodecylcyclohexyl-N-hydroxyethyl)-amino-propane-sulfonate is obtained practically in theoretical yield.

This product with the addition of the customary auxiliary washing agents can be worked into powder, flakes or pieces. It constitutes a valuable washing and cleaning agent which is gentle on the skin. The following preparations may be prepared using the high molecular organic amino sulfonic acids according to the invention:

(a) 97 parts by weight of the sodium salt obtained according to Example 1 are mixed with 2 parts by weight of oleyl alcohol as a superfatting agent and 1 part by weight of a usual perfume mixture. An excellently foaming shampoo preparation is obtained being without any skin irritating properties.

(b) 77 parts by weight of the sodium salt prepared according to Example 2 are mixed with 20 parts by weight of a 20% aqueous dodecyl sodium sulfate solution, 2 parts by weight of oleyl alcohol and 1 part by weight of a soap perfume are added. The solution possesses excellent washing and foaming properties.

(c) 96 parts by weight of the sodium salt prepared according to Example 1 are milled together with 4 parts by weight of a fatty alcohol mixture $C_{16}$–$C_{18}$. The mixture is perfumed and formed into pieces in a usual manner. The pieces may be used for body cleaning purposes. They possess a good bacteriostatic action against skin bacteria and skin or hair fungi.

(d) 97 parts by weight of the sodium salt obtained according to Example 4 are milled together with 3 parts by weight of a fatty alcohol mixture $C_{16}$–$C_{18}$. The mixture is formed in a usual manner into flakes which may be used as hair washing agents.

The flakes may likewise be used for technical washing purposes such as for textiles. In the latter case it is possible to add some other surface active agents as alkyl sulfates and the like and customary auxiliary washing agents such as phosphates, silicates, carboxymethylcellulose.

We claim:

A member selected from the group consisting of aminoalkanesulfonic acids having the general formula

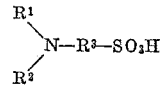

in which $R^1$ represents a hydrocarbon radical having 8 to 18 carbon atoms selected from the group consisting of aliphatic, aliphatic-cycloaliphatic and aliphatic-aromatic hydrocarbon radicals, $R^2$ is a member selected from the group consisting of hydroxyl substituted lower aliphatic hydrocarbon radicals having up to 4 carbon atoms and hydroxyl substituted lower aliphatic hydrocarbon radicals containing an ether group having up to 6 carbon atoms and $R^3$ is a member selected from the group consisting of lower bivalent hydrocarbon radicals and hydoxyl substituted lower bivalent hydrocarbon radicals having from 3 to 4 carbon atoms, and water soluble salts of said acids.

References Cited by the Examiner
UNITED STATES PATENTS

| | | | |
|---|---|---|---|
| 1,944,300 | 1/34 | Ott | 260—513 |
| 2,156,996 | 5/39 | Martin | 252—152 |
| 2,543,852 | 3/51 | Jaccard | 252—152 |
| 2,658,072 | 11/53 | Kosmin | 252—152 |
| 2,673,842 | 3/54 | Brown | 252—152 |
| 2,677,700 | 5/54 | Jackson et al. | 252—152 |
| 2,830,082 | 4/58 | Sexton et al. | 260—513 |

OTHER REFERENCES

Surface Active Agents, by Schwartz et al.: pp. 224, 226, pub. by Interscience Publishers, Inc., New York (1949).

LORRAINE A. WEINBERGER, *Primary Examiner.*

JOSEPH R. LIBERMAN, JULIUS GREENWALD, LEON ZITVER, CHARLES B. PARKER, *Examiners.*